US012623793B2

(12) United States Patent
Meves et al.

(10) Patent No.: US 12,623,793 B2
(45) Date of Patent: May 12, 2026

(54) MACHINE-LEARNING-BASED FLIGHT DATA PARAMETER ESTIMATION

(71) Applicant: THE BOEING COMPANY, Arlington, VA (US)

(72) Inventors: Zachary Robert Meves, Seattle, WA (US); David Felipe Leguizamo, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 157 days.

(21) Appl. No.: 18/615,690

(22) Filed: Mar. 25, 2024

(65) Prior Publication Data

US 2025/0296695 A1 Sep. 25, 2025

(51) Int. Cl.
B64D 45/00 (2006.01)
G06N 3/045 (2023.01)

(52) U.S. Cl.
CPC ............. B64D 45/00 (2013.01); G06N 3/045 (2023.01)

(58) Field of Classification Search
CPC ......... G06N 20/20; G06N 3/045; B64D 45/00
See application file for complete search history.

(56) References Cited

U.S. PATENT DOCUMENTS 10,793,286 B1 * 10/2020 Carrico ................ G05D 1/0653
2018/0346151 A1 * 12/2018 Sturlaugson ........... G06N 20/20

2020/0042903 A1 * 2/2020 Moazzami ............. G06N 20/20
2020/0184131 A1 * 6/2020 Zhang ..................... G06N 20/20
2021/0181694 A1 * 6/2021 Lillestolen ............. G06N 20/20
2023/0088506 A1 * 3/2023 Wiegman ............... B64D 27/34
701/3
2024/0132203 A1 * 4/2024 Madson .................. B64C 13/50

FOREIGN PATENT DOCUMENTS

EP 3255437 A1 * 12/2017 ........... B64C 13/505

* cited by examiner

*Primary Examiner* — Christian Chace
*Assistant Examiner* — Shayne M. Gilbertson
(74) *Attorney, Agent, or Firm* — Moore IP Law

(57) ABSTRACT

An aircraft includes airstream sensors configured to generate airstream data representing measurements of a diverse set of airstream parameters. The aircraft also includes processor(s) configured to provide input data to multiple machine-learning (ML) regression models to generate output data values. The input data provided to each ML regression model is based on the airstream data and represents two or more different airstream parameters, and each output data value represents an estimated value of a flight data parameter. The processor(s) are configured to provide output data values from two or more of the ML regression models to an ensembler to generate a unified output value indicating a unified estimate of the flight data parameter. The processor(s) are configured to generate an output based on a comparison of a procedurally determined computed value of the flight data parameter and the unified output value.

20 Claims, 7 Drawing Sheets

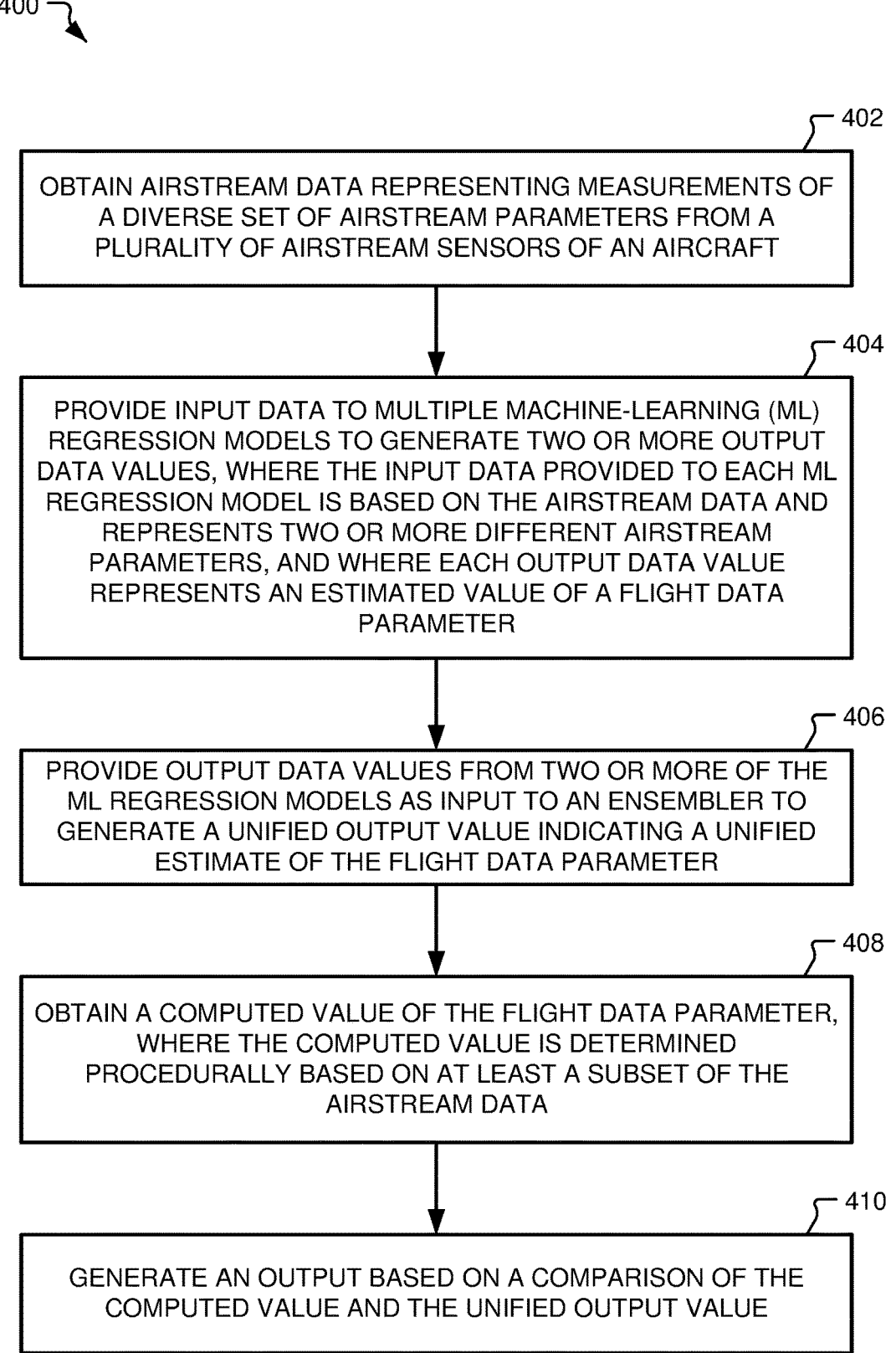

400

402

OBTAIN AIRSTREAM DATA REPRESENTING MEASUREMENTS OF A DIVERSE SET OF AIRSTREAM PARAMETERS FROM A PLURALITY OF AIRSTREAM SENSORS OF AN AIRCRAFT

404

PROVIDE INPUT DATA TO MULTIPLE MACHINE-LEARNING (ML) REGRESSION MODELS TO GENERATE TWO OR MORE OUTPUT DATA VALUES, WHERE THE INPUT DATA PROVIDED TO EACH ML REGRESSION MODEL IS BASED ON THE AIRSTREAM DATA AND REPRESENTS TWO OR MORE DIFFERENT AIRSTREAM PARAMETERS, AND WHERE EACH OUTPUT DATA VALUE REPRESENTS AN ESTIMATED VALUE OF A FLIGHT DATA PARAMETER

406

PROVIDE OUTPUT DATA VALUES FROM TWO OR MORE OF THE ML REGRESSION MODELS AS INPUT TO AN ENSEMBLER TO GENERATE A UNIFIED OUTPUT VALUE INDICATING A UNIFIED ESTIMATE OF THE FLIGHT DATA PARAMETER

408

OBTAIN A COMPUTED VALUE OF THE FLIGHT DATA PARAMETER, WHERE THE COMPUTED VALUE IS DETERMINED PROCEDURALLY BASED ON AT LEAST A SUBSET OF THE AIRSTREAM DATA

410

GENERATE AN OUTPUT BASED ON A COMPARISON OF THE COMPUTED VALUE AND THE UNIFIED OUTPUT VALUE

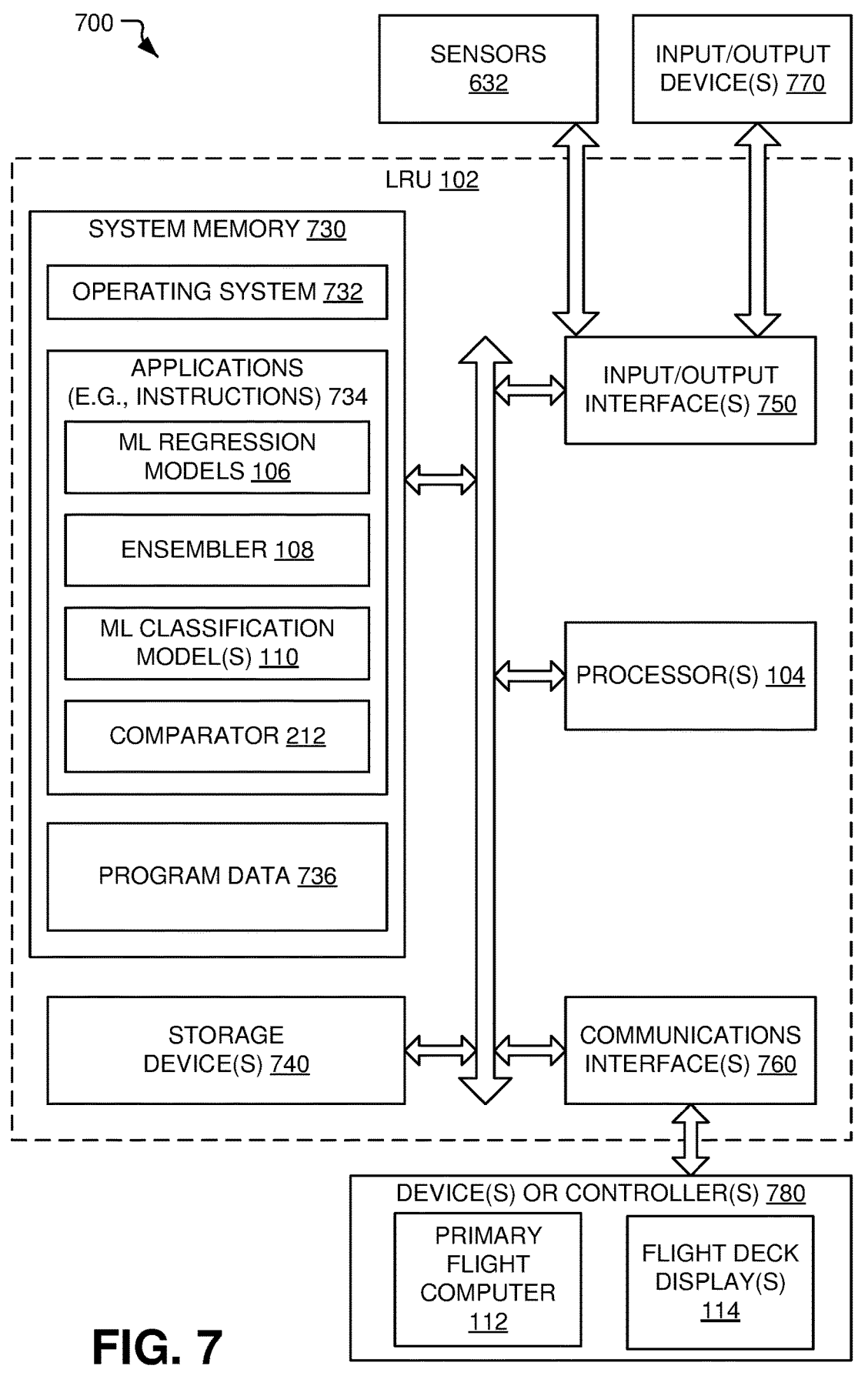

SENSORS
632

INPUT/OUTPUT
DEVICE(S) 770

LRU 102

SYSTEM MEMORY 730

OPERATING SYSTEM 732

APPLICATIONS
(E.G., INSTRUCTIONS) 734

ML REGRESSION
MODELS 106

ENSEMBLER 108

ML CLASSIFICATION
MODEL(S) 110

COMPARATOR 212

PROGRAM DATA 736

INPUT/OUTPUT
INTERFACE(S) 750

PROCESSOR(S) 104

STORAGE
DEVICE(S) 740

COMMUNICATIONS
INTERFACE(S) 760

DEVICE(S) OR CONTROLLER(S) 780

PRIMARY
FLIGHT
COMPUTER
112

FLIGHT DECK
DISPLAY(S)
114

FIG. 7

MACHINE-LEARNING-BASED FLIGHT DATA PARAMETER ESTIMATION

FIELD OF THE DISCLOSURE

The present disclosure is generally related to estimation of flight data parameters using machine-learning.

BACKGROUND

Conventional methods for determining calculated flight data parameters of aircraft assume proper calibration and operation of sensors. Additionally, many flight data parameters are calculated based on data from two or more sensors (e.g., temperature and static pressure). Errors can be introduced in such flight data parameters due to issues with any of these sensors.

Redundancies are generally built in to limit the effect of improperly calibrated sensors; nevertheless, there is always a desire to further improve reliability of flight data systems for aircraft. Adding additional redundant sensors is one way that reliability can be further improved. However, additional redundant sensors add cost, weight, and complexity to the aircraft.

SUMMARY

According to one implementation of the present disclosure, an aircraft includes a plurality of airstream sensors configured to generate airstream data representing measurements of a diverse set of airstream parameters. The aircraft also includes one or more processors configured to provide input data to multiple machine-learning (ML) regression models to generate two or more output data values. The input data provided to each ML regression model is based on the airstream data and represents two or more different airstream parameters, and each output data value represents an estimated value of a flight data parameter. The one or more processors are further configured to provide output data values from two or more of the ML regression models as input to an ensembler to generate a unified output value indicating a unified estimate of the flight data parameter. The one or more processors are also configured to obtain a computed value of the flight data parameter, where the computed value is determined procedurally based on at least a subset of the airstream data. The one or more processors are further configured to generate an output based on a comparison of the computed value and the unified output value.

According to another implementation of the present disclosure, a method includes obtaining airstream data representing measurements of a diverse set of airstream parameters from a plurality of airstream sensors of an aircraft. The method also includes providing input data to multiple ML regression models to generate two or more output data values. The input data provided to each ML regression model is based on the airstream data and represents two or more different airstream parameters, and each output data value represents an estimated value of a flight data parameter. The method further includes providing output data values from two or more of the ML regression models as input to an ensembler to generate a unified output value indicating a unified estimate of the flight data parameter. The method also includes obtaining a computed value of the flight data parameter, where the computed value is determined procedurally based on at least a subset of the airstream data. The method further includes generating an output based on a comparison of the computed value and the unified output value.

According to another implementation of the present disclosure, a line-replaceable unit includes one or more processors configured to obtain airstream data representing measurements of a diverse set of airstream parameters from a plurality of airstream sensors of an aircraft. The one or more processors are further configured to provide input data to multiple ML regression models to generate two or more output data values. The input data provided to each ML regression model is based on the airstream data and represents two or more different airstream parameters, and each output data value represents an estimated value of a flight data parameter. The one or more processors are also configured to provide output data values from two or more of the ML regression models as input to an ensembler to generate a unified output value indicating a unified estimate of the flight data parameter. The one or more processors are further configured to obtain a computed value of the flight data parameter, where the computed value is determined procedurally based on at least a subset of the airstream data. The one or more processors are also configured to generate an output based on a comparison of the computed value and the unified output value.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 4 is a flowchart illustrating an example of a method of using ML models to estimate flight data parameters according to a particular implementation.

FIG. 7 is a block diagram of a computing environment including a line-replaceable unit configured to support aspects of computer-implemented methods and computer-executable program instructions (or code) according to the present disclosure.

DETAILED DESCRIPTION

Figure 1:
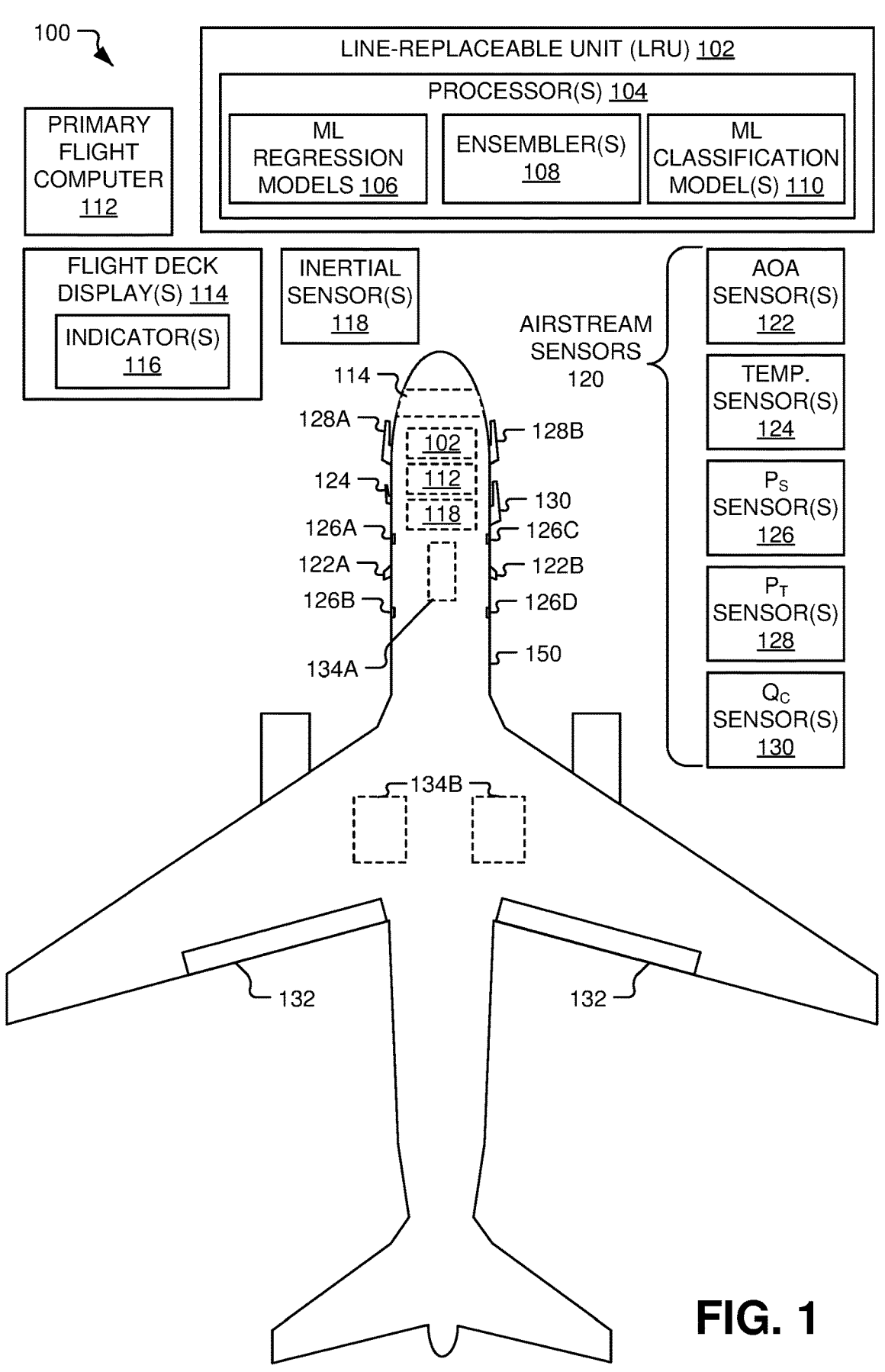
FIG. 1 is a diagram that illustrates an aircraft including a line-replaceable unit configured to use ML models to estimate flight data parameters according to a particular implementation.

The present disclosure describes using machine-learning (ML) techniques to determine flight data parameters. To limit the effect of sensor miscalibration and/or missing data, the disclosed ML techniques can use multiple ML models in an ensemble. The ML models of the ensemble can have different configurations, such as different architectures and/or different input data, such that even in the case of missing data (e.g., due to a sensor failure), some of the ML models remain unaffected. Thus, the ensemble of ML models can improve reliability of flight data parameter determination without increasing the number or type of sensors installed on the aircraft.

In some implementations, output of the ensemble of ML models can be used to cross-check calculated values of the flight data parameters. For example, a flight control computer of the aircraft can use procedural techniques to determine a sideslip angle of the aircraft based on sensor data, and an ensemble of ML models can use the same sensor data (or portions thereof), and optionally other data, to estimate the sideslip angle of the aircraft. In some implementations, the sideslip angle determined by the flight control computer can be used as it conventionally is (e.g., to generate flight deck display information, as input to control laws, etc.), and the estimated sideslip angle from the ensemble of ML models can be used to check validity of unexpected sideslip angle values. In such implementations, the output of the ensemble of ML models can be used to generate an alert (e.g., an indicator in a flight deck display or a maintenance alert) to notify aircraft flight crew or ground crew to check one or more particular sensors and/or related systems.

Additionally, some or all of the ML models of the ensemble can be trained using training data specifically tuned to include noise (e.g., Gaussian noise) to enable the ensemble to make reliable estimates of flight data parameters using noisy or even corrupted sensor data. Some or all of the ML models of the ensemble can also be trained independently of sensor calibration such that miscalibration and/or gradual calibration drift has less impact on results produced by the ensemble than may be present in calculated values of the flight data parameters.

The disclosed techniques add software (e.g., the ML models) to the aircraft, but little or no hardware. Thus, the disclosed techniques improve reliability of the flight data parameters without significantly increasing the weight of the aircraft.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific implementations or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple machine-learning (ML) regression models 106 are illustrated and associated with reference numbers 106A, 106B, and 106C. When referring to a particular one of these ML regression models, such as the ML regression model 106A, the distinguishing letter "A" is used. However, when referring to any arbitrary one of these ML regression models or to these ML regression models as a group, the reference number 106 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts one or more processors 104 ("processor(s)" 104 in FIG. 1) of a line-replaceable unit (LRU) 102, which indicates that in some implementations the LRU 102 includes a single processor 104 and in other implementations the LRU 102 includes multiple processor 104. For ease of reference herein, such features are generally introduced as "one or more" features and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

As used herein, the term "machine learning" should be understood to have any of its usual and customary meanings within the fields of computer science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis.

For certain types of machine learning, the results that are generated include a data model (also referred to as a "machine-learning model" or simply a "model"). Typically, a model is generated using a first data set to facilitate analysis of a second data set. For example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both).

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data, which in the creation/training phase, is generally referred to as "training data". Note that the trained model corresponds to software that has been generated and/or refined during the creation/training phase to perform particular operations, such as classification, prediction, encoding, or other data analysis or data synthesis operations. During the runtime phase, or "inference" phase, the model is used to analyze input data to generate model output. The content of the model output depends on the type of model. For example, a model can be trained to perform classification tasks or regression tasks, as non-limiting examples.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so-called "transfer learning." In transfer learning, a base model may be trained using a generic or typical data set, and the base model may be subsequently refined (e.g., re-trained or further trained) using a more specific data set.

Training a model based on a training data set involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value.

FIG. 1 is a diagram that illustrates an aircraft 100 including a line-replaceable unit (LRU) 102 configured to use ML models to estimate flight data parameters according to a particular implementation. Particular features of the aircraft 100 are annotated in FIG. 1 to call attention to aspects of the disclosure. For example, in FIG. 1, a fuselage 150, landing gear 134 (e.g., a nose landing gear 134A, and main landing gear 134B), and flaps 132 of the aircraft 100 are annotated. It should be understood that the aircraft 100 includes many features common to private, commercial, or military aircraft, even though such features are not annotated in FIG. 1. Further, although the aircraft 100 is illustrated as a fixed-wing craft, in other implementations, the aircraft 100 can include a rotary wing craft or a hybrid aircraft.

The aircraft 100 also includes a plurality of airstream sensors 120 and optionally other sensors, such as one or more inertial sensors 118. The aircraft 100 also includes one or more flight deck displays 114 and a primary flight computer 112. In this context, the "primary flight computer" refers to any conventional flight computer (e.g., a flight management system computer, a flight control computer, etc.) that determines flight data parameters based on sensor data using procedural calculations (as distinct from machine-learning techniques).

The airstream sensors 120 are configured to generate airstream data representing measurements of a diverse set of airstream parameters. For example, the airstream sensors 120 can include one or more angle of attack (AOA) sensors 122 (e.g., AOA vanes) each configured to generate sensor data indicating a local AOA. As another example, the airstream sensors 120 can include one or more temperature sensors 124 (e.g., total air temperature sensors) each configured to generate sensor data indicating ambient air temperature (e.g., total air temperature). As another example, the airstream sensors 120 can include one or more total pressure $(P_T)$ sensors each configured to generate sensor data indicating a total pressure. As another example, the airstream sensors 120 can include one or more static pressure $(P_S)$ sensors each configured to generate sensor data indicating a static pressure. As another example, the airstream sensors 120 can include one or more impact pressure $(Q_C)$ sensors each configured to generate sensor data indicating impact pressure.

In many instances, the aircraft 100 includes two or more of each type of sensor 122-128. For example, the aircraft 100 can include a first AOA sensor 122A on a first side of the fuselage 150 of the aircraft 100, and a second AOA sensor 122B on a second side of the fuselage 150. As another example, the aircraft 100 can include a first total pressure sensor 128A on the first side of the fuselage 150 and a second total pressure sensor 128B total pressure on the second side of the fuselage 150. As another example, the aircraft 100 can include a first static pressure sensor 126A and a second static pressure sensor 126B on the first side of the fuselage 150, and a third static pressure sensor 126C and a fourth static pressure sensor 126D on the second side of the fuselage 150. In some implementations, the aircraft 100 includes an impact pressure sensor 130 instead of or in addition to the total pressure sensor(s) 128. In other implementations, the aircraft 100 includes other combinations or arrangements of the airstream sensors 120, different types of airstream sensors 120, or both.

The inertial sensor(s) 118 are configured to generate inertial data indicative of the motion and/or orientation of the aircraft 100. For example, the inertial sensor(s) 118 can include one or more accelerometers, one or more gyroscopes, or both.

The primary flight computer 112 is configured to generate a primary set of flight data values. That is, the values generated by the primary flight computer 112 are used as the main source of information for the flight deck display(s) 114, for navigation of the aircraft 100, for control of the aircraft 100, etc. The primary flight computer 112 uses conventional procedurally-driven calculations (in contrast to ML techniques) to determine the primary set of flight data values. Non-limiting examples of flight data parameters that can be computed by the primary flight computer 112 include an angle of attack, a Mach number, a sideslip angle, and an altitude.

The LRU 102 is configured to use ML techniques to generate estimated values of flight data parameters. To distinguish the flight data parameter values determined by the LRU 102 using ML techniques from the flight data parameter values determined by the primary flight computer 112 using conventional procedurally-driven calculations, the values determined by the primary flight computer 112 are generally referred to herein as "calculated values," and the values determined by the LRU 102 are generally referred to as "estimated values."

In FIG. 1, the LRU 102 includes one or more processors 104 configured to execute instructions associated with multiple ML regression models 106, one or more ensemblers 108, and one or more ML classification models 110. The ML regression models 106 include any type (or a variety of types) of ML models that are configured to perform regression operations (e.g., to output one or more numeric values, such as floating-point values, indicating estimates of one or more dependent variables based on input values representing independent variables). Although many types of ML models can be configured to perform regression operations, typical models used for regression include, without limitation, decision trees, neural networks, Bayesian models, neural fuzzy inference systems, and variants thereof.

In a particular implementation, each ensembler 108 is associated with a set of two or more ML regression models 106 that are each trained to estimate a particular flight data parameter. For example, a first set of two or more ML regression models 106 may be associated with a first ensembler 108, and a second set of two or more ML regression models 106 may be associated with a second ensembler 108. In this example, each ML regression model 106 of the first set is configured to estimate a value of a first flight data parameter, and the first ensembler 108 is configured to generate a unified estimate (e.g., a unified output value) of the first flight data parameter based on estimates from the first set of ML regression models 106. Further, in this example, each ML regression models 106 of the second set is configured to estimate a value of a second flight data parameter, and the second ensembler 108 is configured to generate a unified estimate of the second flight data parameter based on estimates from the second set of ML regression models 106.

Each of the ensembler(s) 108 can use various techniques to generate the unified output value. For example, each of the ML regression models associated with an ensembler 108 can output a corresponding estimated value of a flight data parameter, and the ensembler 108 can select a single estimated value from among the estimated values. In this example, the ensembler 108 can use voting techniques or a statistical technique (e.g., selection of a mode value or a median value) to select the unified output value. In other examples, the ensembler 108 uses other statistical analysis techniques to determine a unified output value that does not necessarily correspond to one of the estimated values from the ML regression models 106. To illustrate, the ensembler 108 can determine an average from among the estimated values from the ML regression models 106. The ensembler 108 may also apply techniques to exclude unreliable estimated values (e.g., outliers) from consideration in determination of the unified estimated value. Additionally, or alternatively, the ensembler(s) 108 can apply other data fusion or data selection techniques to generate a unified output value indicating a unified estimate of the flight data parameter based on estimated values from the ML regression models 106 associated with each of the ensembler(s) 108.

In some implementations, the ML regression models 106 associated with one of the ensembler(s) 108 include a variety of models that are all configured to estimate a value of a single flight parameter based on different combinations and subsets of the airstream parameters and optionally other data. In such implementations, the ML regression models 106 associated with one of the ensembler(s) 108 can include ML models configured to use different input data, such as different subsets of the airstream data generated by the airstream sensors 120. For example, the ML regression models 106 can include a first ML regression model configured to generate a first estimated value of a flight data parameter based on a first subset of the airstream parameters and a second ML regression model configured to generate a second estimated value of the flight data parameter (e.g., the same flight data parameter) based on a second subset of the airstream parameters. In this example, the first subset of the airstream parameters includes one or more airstream parameters absent from the second subset of the airstream parameters. To illustrate, the first subset of the airstream parameters can include one or more local AOA values, one or more temperature values, one or more total pressure values, and one or more static pressure values, and the second subset of the airstream parameters can include fewer than all of these values, such as one or more local AOA values, one or more temperature values, one or more total pressure values, and only one static pressure value.

In some implementations, the ML regression models 106 associated with one of the ensembler(s) 108 include a variety of types of ML models, ML models with different architectures, or both. For example, the ML regression models 106 include a first ML regression model having a first model architecture and a second ML regression model having a second model architecture that is different than the first model architecture. To illustrate, the first ML regression model can include a feed-forward neural network, and the second ML regression model can include a recurrent neural network. As another example, the first ML regression model can include a first count of hidden layers (e.g., three hidden layers), and the second ML regression model can include a second count of hidden layers (e.g., two hidden layers). As another illustrative example, the first ML regression model can include a neural network, and the second ML regression model can include a decision tree.

In some implementations, one or more of the ML regression models 106 associated with one of the ensembler(s) 108 can be configured to accept input data based on at least a subset of the airstream data and based on other data. Examples of other data that can be used by one or more of the ML regression models 106 include, without limitation, configuration data indicating a configuration setting of the aircraft 100, such as a flap setting of the flaps 132, a landing gear position of the landing gear 134, other configuration settings, or a combination thereof. As another example, one or more of the ML regression models 106 can be configured to receive input data representing inertial sensor data from the inertial sensor(s) 118.

The ML classification models 110 of the LRU 102 include any type (or a variety of types) of ML models that are configured to perform classification operations. Although many types of ML models can be configured to perform classification operations, typical models used for classification include, without limitation, support vector machines, Naïve Bayes classifiers, decision trees, neural networks, neural fuzzy inference systems, and variants thereof. In this context, classification refers to generating output data indicating a class associated with a set of input data. Often, classes are indicated using a vector of binary values. For example, a value of 1 associated with a particular class indicates that the input data is associated with the particular class, and a value of 0 associated with a particular class indicates that the input data is not associated with the particular class.

In some cases, an ML classification model 110 can also, or alternatively, generate a confidence value associated with a particular class. For example, the ML classification model 110 can output a vector that includes one value per class, where each value indicates a confidence estimate that the input data is associated with the corresponding class. Although classification can be performed for multiple classes at the same time, it can alternatively be performed for a single class, in which case the ML classification model 110 can output a single value (e.g., a binary value or a confidence value) indicating whether the input data is associated with the single class. In the example of FIG. 1, the ML classification model 110 can be configured to generate one or more output values indicating whether one or more values of the airstream data is considered to be valid. In this example, the LRU 102 can be configured to generate an alert based on a determination that one or more values of the airstream data are invalid. For example, the alert can be provided to the ensembler 108 to cause the ensembler 108 to omit from consideration the flight data parameter estimates from any ML regression models 106 that use the invalid airstream data as part of its input. As another example, an alert can be provided to the flight deck display(s) 114, to the primary flight computer 112, or both.

In a particular aspect, the ML regression models 106, the ensembler(s) 108, the ML classification model(s) 110, or a combination thereof, can be trained using training data that represents an entire flight envelope of the aircraft 100. For many aircraft, recorded flight data from actual flights can be used for at least a portion of the training data. However, it may often be the case that extreme or unusual flight conditions will not be well represented in recorded flight data from actual flights, in which case simulated flight data can be used or recorded flight data can be augmented to produce samples sufficient to train the various models to handle extreme or unusual flight conditions.

During operations (e.g., during a flight of the aircraft 100), the airstream sensors 120 detect various characteristics of an airstream around the aircraft 100 and generate airstream data. The airstream data can be stored to a memory that is accessible to the processor(s) 104 of the LRU 102 and the primary flight computer 112, or one or more of the airstream sensors 120 can provide a signal representing a corresponding airstream parameters to the LRU 102, to the primary flight computer 112, or both, via a data bus of the aircraft 100. The primary flight computer 112 uses at least a subset of the airstream data to compute a value of a flight data parameter.

The processor(s) 104 provides input data to the ML regression models 106 to generate two or more output data values. The input data provided to each ML regression model 106 is based on the airstream data and represents two or more different airstream parameters. In some cases, different ML regression models can receive input data based on different ones of the airstream parameters. The input data for each ML regression model 106 can include raw sensor data, sample sensor data, aggregated sensor data, or other features representative of the sensor data (e.g., a frequency domain representation of the sensor data). In some implementations, the input data can also include other data, such as aircraft configuration data, inertial sensor data, etc.

Each ML regression model 106 generates an output data value representing an estimated value of a flight data parameter based on the input data provided to the ML regression model 106. A set of ML regression models 106 that generate estimated values of a particular flight data parameter are associated with one of the ensembler(s) 108. The processor(s) 104 are configured to provide output data values from two or more of the ML regression models 106 as input to a respective one of the ensembler(s) 108 to generate a unified output value indicating a unified estimate of the flight data parameter.

The processor(s) 104 are configured to obtain a computed value of the flight data parameter from the primary flight computer 112 and to compare the unified estimate of the flight data parameter from the ensembler 108 to the computed value. The processor(s) 104 generates an output based on results of the comparison of the computed value and the unified output value. For example, if the computed value and the unified output value match (within some specified or context-dependent threshold), the output based on the comparison can indicate agreement of the computed value and the unified output value. To illustrate, the LRU 102 can set a flag or send a signal that indicates no detected concerns associated with the airstream data and/or the flight data parameter. As another example, if the computed value and the unified output value do not match (within some specified or context-dependent threshold), the output based on the comparison can indicate disagreement of the computed value and the unified output value. To illustrate, the LRU 102 can set a flag or send a signal that indicates detection of a concern associated with the airstream data and/or the flight data parameter. In this illustrative example, the flag or signal generated by the LRU 102 can result in a maintenance notification, can be used to generate one or more indicator(s) 116 at the flight deck display(s) 114, or both.

In some implementations, the processor(s) 104 also provides input data to ML classification model(s) 110 to generate a classification output indicating whether one or more values of the airstream data is considered to be valid. The input data provided to the ML classification model(s) 110 can be the same as the input data provided to one or more of the ML regression models 106, or it can be different. As an example, each of the ML regression models 106 can be provided input data based on a subset of the airstream data, and a single ML classification model 110 can be provided the entire set of airstream data. The processor(s) 104 can generate an alert based on the output of the ML classification model(s) 110. For example, if the output of the ML classification model(s) 110 indicates a determination that one or more values of the airstream data are invalid, the processor(s) 104 can provide an alert to the flight deck display(s) 114, to the primary flight computer 112, or both. Alternatively, if the output of the ML classification model(s) 110 indicates a determination that one or more values of the airstream data are invalid, the processor(s) 104 can alert the ensembler(s) 108 to omit from consideration any ML regression models 106 that use the particular airstream parameter that is associated with the invalid value.

The operations above can be repeated (in parallel or in series) for two or more different flight data parameters. For example, while performing the operations above, the processor(s) 104 can use one or more different cores or one or more different processing threads to provide additional input data to additional ML regression models to generate additional output data values. In this example, the additional input data provided to each additional ML regression model is based on the airstream data and represents two or more different airstream parameters, and each additional output data value represents an estimated value of an additional flight data parameter. Further, in this example, the processor(s) 104 can provide additional output data values from two or more of the additional ML regression models as input to an additional ensembler to generate an additional unified output value indicating a unified estimate of the additional flight data parameter. The processor(s) 104 can also obtain a computed value of the additional flight data parameter. In this example, the output generated by the processor(s) 104 is further based on a comparison of the additional computed value and the additional unified output value.

Figure 2:
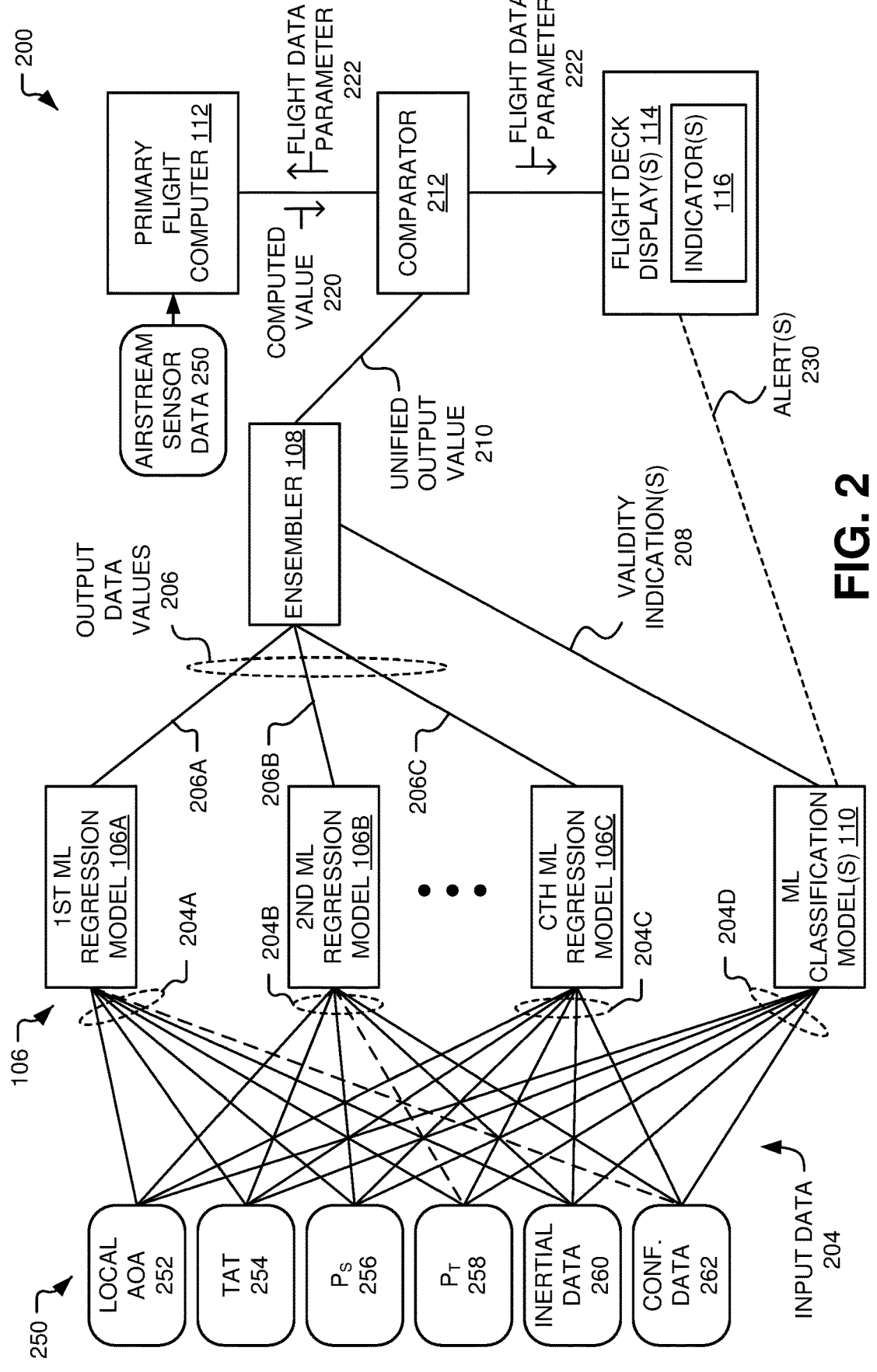
FIG. 2 is a diagram illustrating aspects of operation of ML models to estimate flight data parameters according to a particular implementation.

FIG. 2 is a diagram 200 illustrating aspects of operation of ML models to estimate flight data parameters according to a particular implementation. In particular, the diagram 200 illustrates data flow among a set of components that are configured to use airstream sensor data 250 and optionally other data (such as inertial data 260 and/or configuration data 262) to determine a value of a particular flight data parameter 222. Operations described with reference to FIG. 2 can be repeated for other flight data parameters. For example, the flight data parameter 222 of FIG. 2 can correspond to a sideslip angle of the aircraft 100 of FIG. 1, and the operations described with reference to FIG. 2 can be repeated to determine an angle of attack of the aircraft 100, an altitude of the aircraft, a Mach number for the aircraft 100, etc.

In FIG. 2, the airstream sensor data 250 includes, for example, local AOA 252, total air temperature 254, static pressure 256, and total pressure 258. For example, the local AOA 252 can be determined based on or indicated by the AOA sensor(s) 122 of FIG. 1, the total air temperature 254 can be determined based on or indicated by the temperature sensor(s) 124, the static pressure 256 can be determined based on or indicated by the static pressure sensors 126, and the total pressure sensors 128 can be determined based on or indicated by the total pressure sensor(s) 128. In some implementations, the total pressure 258 can be replaced by impact pressure.

In implementations that use the inertial data 260, the inertial data 260 can be determined based on or indicated by the inertial sensor(s) 118. In implementations that use the configuration data 262, the configuration data 262 can be determined based on or indicated by signals from various aircraft control systems or the primary flight computer 112. For example, the configuration data 262 can include an indication of a flap setting, which can be generated by a control system associated with the flaps 132 or can be generated by the primary flight computer 112. As another example, the configuration data 262 can include an indication of a landing gear setting, which can be generated by a control system associated with the landing gear 134 or can be generated by the primary flight computer 112.

Input data 204 for the multiple ML regression models 106 and the ML classification model(s) 110 is generated based on the airstream sensor data 250 and optionally the other data. The input data 204 can include the raw sensor data values or the sensor data values can be preprocessed to generate the input data 204. Examples of preprocessing operations that can be used to generate the input data 204 include sampling, domain transforms, normalization, filtering (e.g., to suppress noise), data supplementation (e.g., estimating missing values), among others.

In some implementations, the input data 204 for a particular ML regression model 106 includes or is based on a subset of the airstream sensor data 250 and optionally the other data. For example, in FIG. 2, input data 204A for a first ML regression model 106A can omit the configuration data 262 (as indicated by the dotted line between the configuration data 262 and the first ML regression model 106A), and input data 204B for a second ML regression model 106B can omit the total pressure 258. In FIG. 2, input data 204C for a Cth ML regression model 106C (where C is an integer greater than two) can include all of the airstream sensor data 250 and the optional other data or can include a subset of the airstream sensor data 250 and the optional other data. The Cth ML regression model 106C is optional and is intended to indicate that a system can include two ML regression models (e.g., the first and second ML regression models 106A and 106B) or more than two ML regression models (e.g., three, four, ten, or any other number of ML regression models 106 limited only by available computing resources).

In the same or different implementations, the ML regression models 106 can have different model architectures. For example, the first ML regression model 106A can include a first count of hidden layers, and the second ML regression model 106B can include a second count of hidden layers that is different from the first count of hidden layers. Additionally, or alternatively, the first ML regression model 106A can include a neural network, and the second ML regression model 106B can include a regression tree or a regression forest (e.g., a decision tree configured and trained to perform regressions), or another type of regression model. Additionally, or alternatively, the first ML regression model 106A can include a feed-forward neural network, and the second ML regression model 106B can include a recurrent neural network.

The ML regression models 106 can optionally differ from one another in other ways. For example, a first subset of training data can be used to train the first ML regression model 106A, and a second subset of training data can be used to train the second ML regression model 106B. In this example, even if the first ML regression model 106A and the second ML regression model 106B have the same architecture and the input data 204A is the same as the input data 204B, differences in the training of the first and second ML regression models 106A, 106B will generally result in differences in the model parameters of the first and second ML regression models 106A, 106B, leading to differences in analysis of the input data 204A and 204B. As another example, different training techniques can be used to train two or more of the ML regression models 106, resulting in differences in the model parameters of the ML regression models 106 and leading to differences in analysis of the input data 204.

Each of the ML regression models 106 generates an output data value 206 based on the input data 204 provided to the ML regression model 106. For example, the first ML regression model 106A generates output data value 206A based on the input data 204A, the second ML regression model 106B generates output data value 206B based on the input data 204B, and the Cth ML regression model 106C generates output data value 206C based on the input data 204C. Each of the output data values 206 represents an estimated value of the flight data parameter 222.

In some implementations, the airstream sensor data 250 and the other data, or a subset thereof, are provided as input data 204D to the ML classification model(s) 110. In such implementations, the ML classification model(s) 110 are configured to generate one or more validity indications 208, where each validity indication 208 indicates whether a particular value among the airstream sensor data 250 is considered valid. In some implementations, if the ML classification model(s) 110 determines that one or more values of the airstream data are invalid, the ML classification model(s) 110 can generate one or more alerts 230. The alert(s) 230 can identify the invalid airstream data values or a sensor associated with the invalid airstream data. In some such implementations, the alert(s) 230 are generated in response to determining multiple invalid values from a particular sensor, indicating a possible ongoing issue with the particular sensor. The alert(s) 230 can be provided to the flight deck displays 114 to generate indicators 116, to the primary flight computer 112, to other systems of the aircraft 100 of FIG. 1, such as maintenance notifications system, or any combination thereof.

The output data values 206, and optionally the validity indication(s) 208, are provided as input to the ensembler 108. The ensembler 108 is configured to generate a unified output value 210 indicating a unified estimate of the flight data parameter based on the output data values 206 from the ML regression models 106. The ensembler 108 can perform various data fusion operations, data selection operations and/or data aggregation operations, as described with reference to FIG. 1, to generate the unified output value 210.

In some implementations, the ensembler 108 can generate the unified output value 210 based only on airstream sensor data 250 that is considered valid. For example, if the validity indication(s) 208 indicate that the total pressure value 258 is invalid, the ensembler 108 can disregard output data values 206 from ML regression models 106 that receive the total pressure value 258 as part of their input data 204. To illustrate, in the example illustrated in FIG. 2, the input data 204A to the first ML regression model 106A includes the total pressure value 258, and the input data 204B to the second ML regression model 106B does not include the total pressure value 258. Thus, if the validity indication(s) 208 indicate that the total pressure value 258 is considered invalid, the ensembler 108 can generate the unified output value 210 based on the output data value 206B from the second ML regression model 106B and not based on the output data value 206A from the first ML regression model 106A.

In the example illustrated in FIG. 2, the unified output value 210 and a corresponding computed value 220 are provided to a comparator 212. The computed value 220 is determined by the primary flight computer 112 based on at least a subset of the airstream data 250. The primary flight computer 112 uses procedural techniques (as distinct from ML-based techniques) to determine the computed value 220. For example, the primary flight computer 112 can perform calculations using physics-based principles and relationships, engineering calculations, etc., to determine the computed value 220.

The comparator 212 is configured to compare the unified output value 210 and the computed value 220 to determine whether the unified output value 210 and the computed value 220 match. In this context, the unified output value 210 and the computed value 220 are considered to match if they differ by less than some threshold amount. The threshold can be context specific. For example, the threshold for a particular flight data parameter can be larger at higher altitudes than at lower altitudes. As another example, the threshold for a particular flight data parameter can be larger during particular stages of a flight (e.g., cruise) than during other stages (e.g., take-off or landing).

The comparator 212 generates one or more outputs based on the comparison. For example, in FIG. 2, the comparator 212 outputs an agreed value of the flight data parameter 222 to the primary flight computer 112, to the flight deck displays 114, or both, based on the comparison indicating that the unified output value 210 and the computed value 220 match. In other examples, the comparator 212 can output an alert in response to a determination that the unified output value 210 and the computed value 220 do not match. In such examples, the alert can be provided to the primary flight computer 112, to the flight deck displays 114, to another system of the aircraft 100 (e.g., a maintenance system), or any combination thereof.

Figure 3:
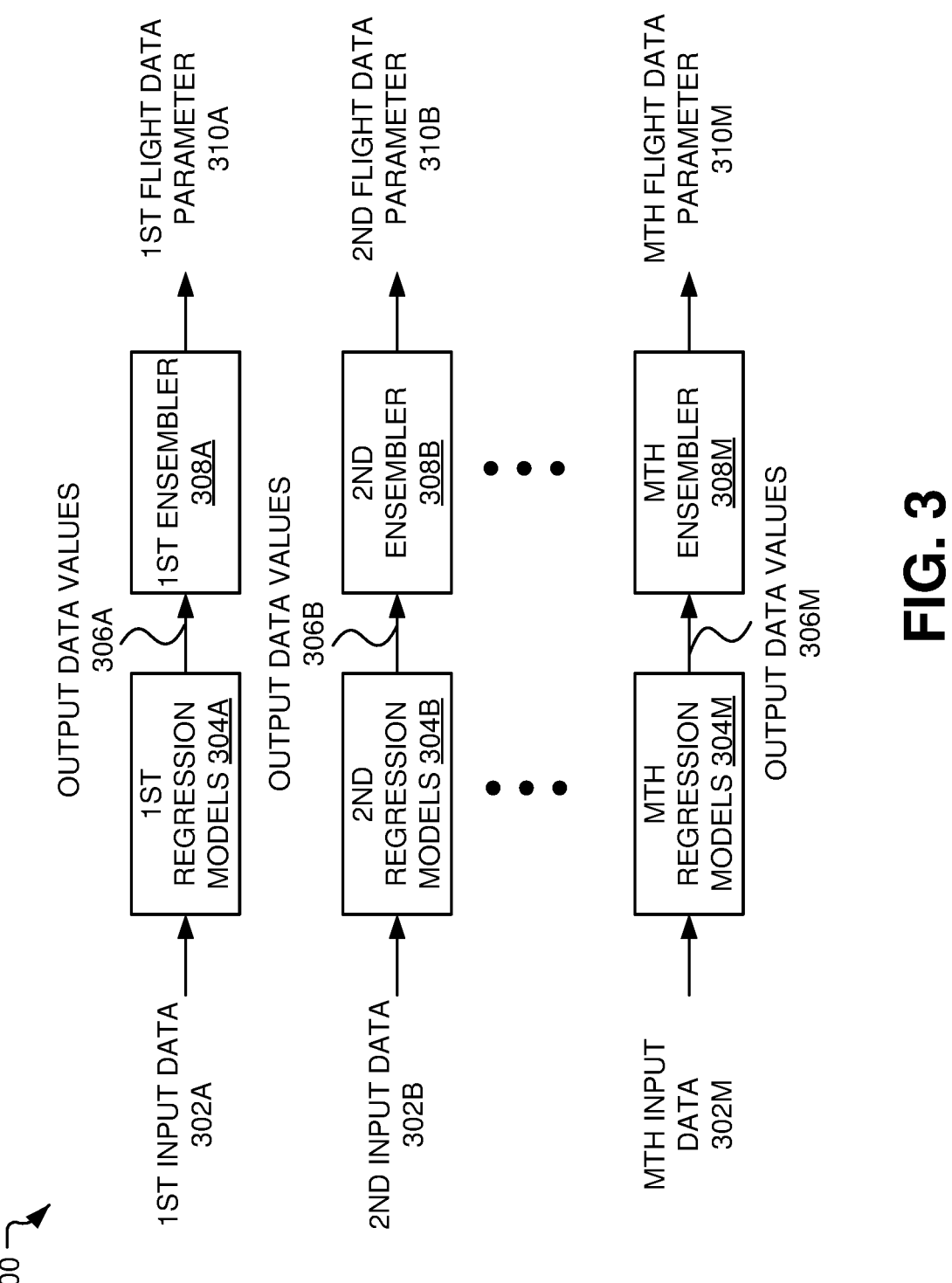
FIG. 3 is a diagram illustrating further aspects of operation of ML models to estimate flight data parameters according to a particular implementation.

The operations described with reference to FIG. 2 (or a subset thereof) can be repeated for various flight data parameters. For example, FIG. 3 is a diagram 300 illustrating further aspects of operation of ML models to estimate flight data parameters according to a particular implementation. In particular, the diagram 300 of FIG. 3 illustrates using a plurality of sets of ML regression models 304 to estimate values of multiple distinct flight data parameters 310. Each of the sets of ML regression models 304 can correspond to an instance of the ML regression models 106 of FIGS. 1 and 2. For example, a first set of ML regression models 304A can include multiple of the ML regression models 106 that are configured and trained to generate output data values 306A corresponding to distinct estimates of a value of a first flight data parameter 310A, a second set of ML regression models 304B can include multiple of the ML regression models 106 that are configured and trained to generate output data values 306B corresponding to distinct estimates of a value of a second flight data parameter 310B, and an Mth set of ML regression models 304M can include multiple of the ML regression models 106 that are configured and trained to generate output data values 306M corresponding to distinct estimates of a value of an Mth flight data parameter 310M (where M is an integer greater than two). In this example, the first flight data parameter 310A, the second flight data parameter 310B, and the Mth flight data parameter 310M are distinct from one another.

In FIG. 3, each of the sets of ML regression models 304 is provided input data 302. For example, the first set of ML regression models 304A is provided first input data 302A, the second set of ML regression models 304B is provided second input data 302B, and the Mth set of ML regression models 304M is provided Mth input data 302M. The sets of input data 302 can be different from one another, or two or more of the sets of input data 302 can be the same as one another. Each of the sets of the input data 302 can include all of or any portion of the input data 204 of FIG. 2.

In FIG. 3, the output data values 306 from each of the sets of ML regression models 304 are provided to a corresponding ensembler 308. For example, the output data values 306A from the first set of ML regression models 304A are provided as input to a first ensembler 308A to generate the first flight data parameter 310A (e.g., a unified output value). Similarly, the output data values 306B from the second set of ML regression models 304B are provided as input to a second ensembler 308B to generate the second flight data parameter 310B, and the output data values 306M from the Mth set of ML regression models 304M are provided as input to a Mth ensembler 308M to generate the Mth flight data parameter 310M.

Although not shown in FIG. 3, in some implementations, each of the sets of ML regression models 304 of FIG. 3 can be associated with one or more ML classification models (such as the ML classification model(s) 110 of FIGS. 1 and 2). In such implementations, the ML classification model(s) can be configured to receive at least a portion of the input data 302 provided to the associated set of ML regression models 304. For example, ML classification model(s) associated with the first ML regression models 304A can be provided at least a portion of the first input data 302A. In such implementations, output of the ML classification model(s) associated with a set of ML regression models 304 can be provided to the ensembler 308 associated with the set of ML regression models 304 to enable the ensembler 308 to reject or accept particular values from the output data values 306, as described with reference to FIG. 2.

Although not shown in FIG. 3, in some implementations, each of the flight data parameters 310 can be provided to a corresponding comparator, as a unified output value 210, for comparison to a computed value of the flight data parameter. In such implementations, each of the comparators can generate output associated with the flight data parameter 310 based on the comparison.

FIG. 4 is a flowchart illustrating an example of a method 400 of using ML models to estimate flight data parameters according to a particular implementation. In a particular aspect, one or more operations of the method 400 are performed by the LRU 102 of FIG. 1.

The method 400 includes, at block 402, obtaining airstream data representing measurements of a diverse set of airstream parameters from a plurality of airstream sensors of an aircraft. For example, the aircraft can include or correspond to the aircraft 100 of FIG. 1. In this example, the airstream sensors 120 can include the AOA sensor(s) 122, the total pressure sensor(s) 128, the temperature sensor(s) 124, the static pressure sensors 126, the impact pressure sensor(s) 130, or a combination thereof. The airstream parameters can include, for example, two or more of: static pressure, total pressure, impact pressure, local angle of attack, and total air temperature. In some implementations, the method 400 includes obtaining additional data from other aircraft systems. For example, the method 400 may include obtaining inertial sensor data, configuration data (e.g., a flap setting, a landing gear position), etc.

The method 400 includes, at block 404, providing input data to multiple ML regression models to generate two or more output data values. In the method 400, the input data provided to each ML regression model is based on the airstream data and represents two or more different airstream parameters. In some implementations, the input data of at least one of the ML regression models is further based on inertial sensor data from the inertial sensor 118, configuration data associated with the aircraft, or both. In some implementations, one or more of the ML regression models is trained using training data representing an entire flight envelope of the aircraft.

In some implementations, the ML regression models include one or more feed-forward neural networks, one or more recurrent neural networks, or both. Different ML regression models can have different model architectures. For example, the ML regression models can include a first ML regression model with a first model architecture and a second ML regression model with a second model architecture that is different than the first model architecture. To illustrate, the first model architecture can correspond to a feedforward neural network, and the second model architecture can correspond to a recurrent neural network. As another illustrative example, the first model architecture can include a first count of hidden layers, and the second model architecture can include a second count of hidden layers that is different from the first count of hidden layers. As another illustrative example, two or more of the ML regression models can have different input layer configurations. As an example, a first ML regression model can have an input layer configured to receive input data representing a first subset of the airstream parameters. In this example, the first ML regression model is configured to generate a first estimated value of the flight data parameter based on the first subset of the airstream parameters. Further, in this example, a second ML regression model can have an input layer configured to receive input data representing a second subset of the airstream parameters. In this example, the second ML regression model is configured to generate a second estimated value of the flight data parameter based on the second subset of the airstream parameters. In this example, the first subset of the airstream parameters includes one or more airstream parameters absent from the second subset of the airstream parameters. To illustrate, the first subset of the airstream parameters can include a first static pressure sensor value from a first static pressure sensor and the first static pressure sensor value can be omitted from the second subset of the airstream parameters. Optionally, the second subset of the airstream parameters can also include one or more airstream parameters that are absent from the first subset of the airstream parameters.

Additionally, in the method 400, the output data value represents an estimated value of a flight data parameter. For example, the flight data parameter can include or correspond to an aircraft angle of attack, a Mach number, an aircraft sideslip angle, an altitude, another flight data parameter, etc.

The method 400 includes, at block 406, providing output data values from two or more of the ML regression models as input to an ensembler to generate a unified output value indicating a unified estimate of the flight data parameter. For example, in an implementation in which each of a set of ML regression models generates output indicating an estimated value of the sideslip angle of the aircraft, the ensembler is configured to generate a unified output value indicating a unified estimate of the sideslip angle of the aircraft. In some implementations, the unified output value is determined using statistical analysis (such as, outlier rejection, averaging, mode selection, median selection, etc.) of the output data values from two or more of the ML regression models. In other implementations, the unified output value is determined using other data fusion or data selection techniques.

The method 400 includes, at block 408, obtaining a computed value of the flight data parameter, where the computed value is determined procedurally based on at least a subset of the airstream data. For example, the computed value can be determined by applying calibration data to values from various sensors to determine calibrated sensor data and calculating a particular flight data parameter from fundamental physics principles and/or engineering estimates using the calibrated sensor data. In some implementations, the computed value is generated by the primary flight computer 112 of the aircraft 100 of FIG. 1.

The method 400 includes, at block 410, generating an output based on a comparison of the computed value and the unified output value. The nature of the output can vary depending on the result of the comparison. For example, if the unified output value indicating an estimated value of a particular flight data parameter differs significantly (e.g., by more than a specified threshold) from the computed value of the particular flight data parameter, an alert can be generated to indicate (to a crew member or to a flight computer) that the computed value and the estimated value do not match, which may be an indication of an unexpected flight condition or of anomalous sensor data.

In some implementations, the method 400 also includes generating an indicator for a flight deck display based on the output. For example, the output can be used to generate the indicator 116 on the flight deck display(s) 114 of FIG. 1.

In some implementations, the method 400 also includes providing input data to one or more ML classification models to generate a classification output indicating whether one or more values of the airstream data is considered to be valid. For example, the input data provided to the ML classification model(s) includes or is based on at least a subset of the airstream data. In some such implementations, the method 400 can also include generating an alert based on a determination that one or more values of the airstream data are invalid. For example, the alert can be used to generate the indicator 116 on the flight deck display(s) 114 of FIG. 1. As another example, the alert can be used to generate a maintenance notification.

In some implementations, the method 400 is performed multiple times (in series or in parallel) using different ML regression models, different ML classification model(s), different ensemblers, etc. to generate estimates of various flight data parameters. For example, the method 400 can include providing additional input data to multiple additional ML regression models to generate two or more additional output data values, where the additional input data provided to each additional ML regression model is based on the airstream data and represents two or more different airstream parameters, and where each additional output data value represents an estimated value of an additional flight data parameter. In this example, the method 400 also includes providing additional output data values from two or more of the additional ML regression models as input to an additional ensembler to generate an additional unified output value indicating a unified estimate of the additional flight data parameter. In this example, the method 400 further includes obtaining a computed value of the additional flight data parameter, where the computed value of the additional flight data parameter is determined procedurally based on at least a subset of the airstream data. In this example, the output may be further based on a comparison of the additional computed value and the additional unified output value. Alternatively, in this example, the method 400 can include generating one or more additional outputs.

Figure 5:
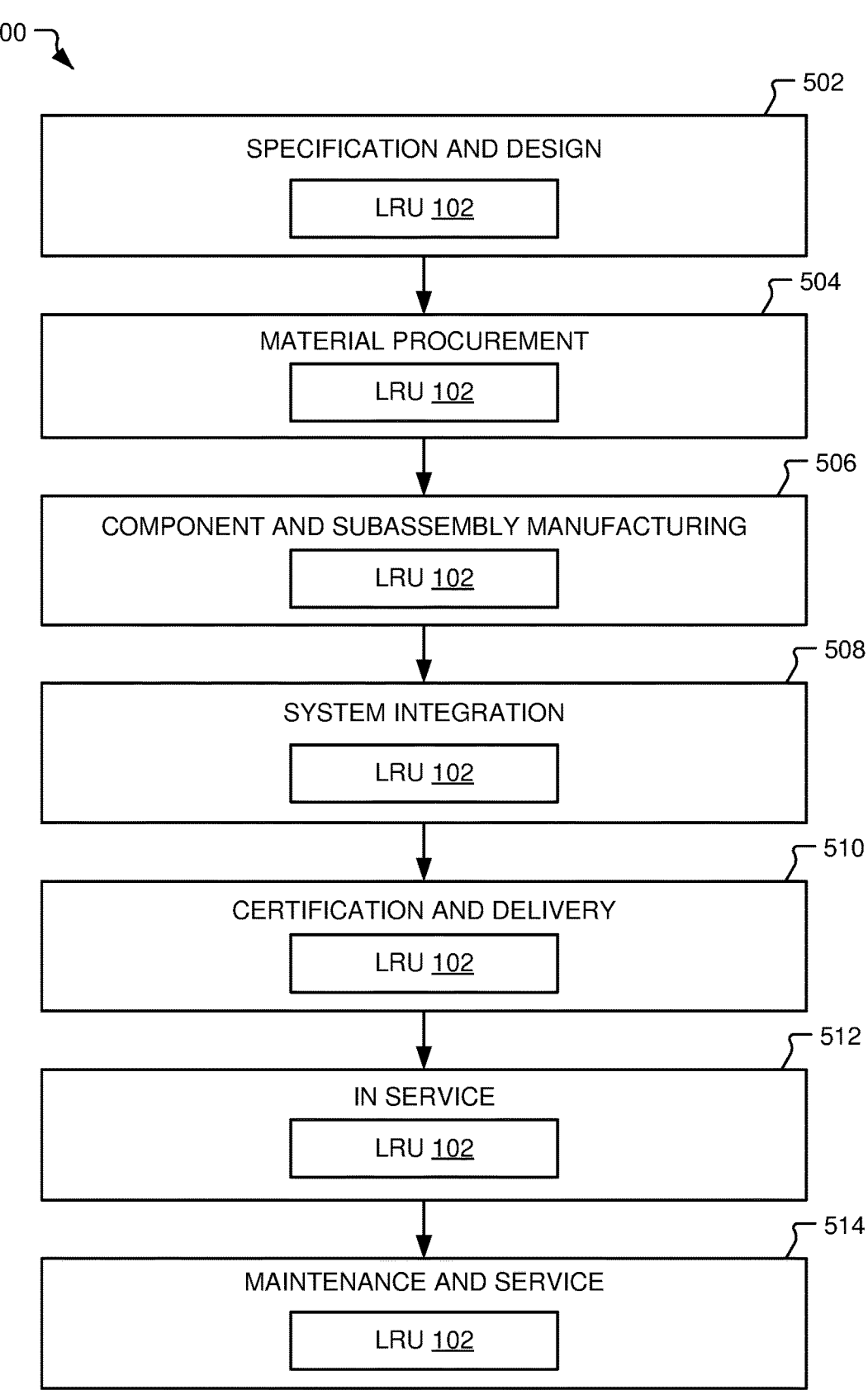
FIG. 5 is a flowchart illustrating an example of a life cycle of the aircraft of FIG. 1.

Referring to FIG. 5, a flowchart illustrative of a life cycle of an aircraft that includes an LRU 102 configured to provide one or more flight data parameter estimates is shown and designated 500. During pre-production, the exemplary method 500 includes, at 502, specification and design of an aircraft, such as the aircraft 100 of FIG. 1. During specification and design of the aircraft, the method 500 may include specification and design of the LRU 102. At 504, the method 500 includes material procurement, which may include procuring materials for the LRU 102.

During production, the method 500 includes, at 506, component and subassembly manufacturing and, at 508, system integration of the aircraft. For example, the method 500 may include component and subassembly manufacturing of the LRU 102 and system integration of the LRU 102. At 510, the method 500 includes certification and delivery of the aircraft and, at 512, placing the aircraft in service. Certification and delivery may include certification of the LRU 102 to place the LRU 102 in service. While in service by a customer, the aircraft may be scheduled for routine maintenance and service (which may also include modification, reconfiguration, refurbishment, and so on). At 514, the method 500 includes performing maintenance and service on the aircraft, which may include performing maintenance and service on the LRU 102.

Each of the processes of the method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 6:
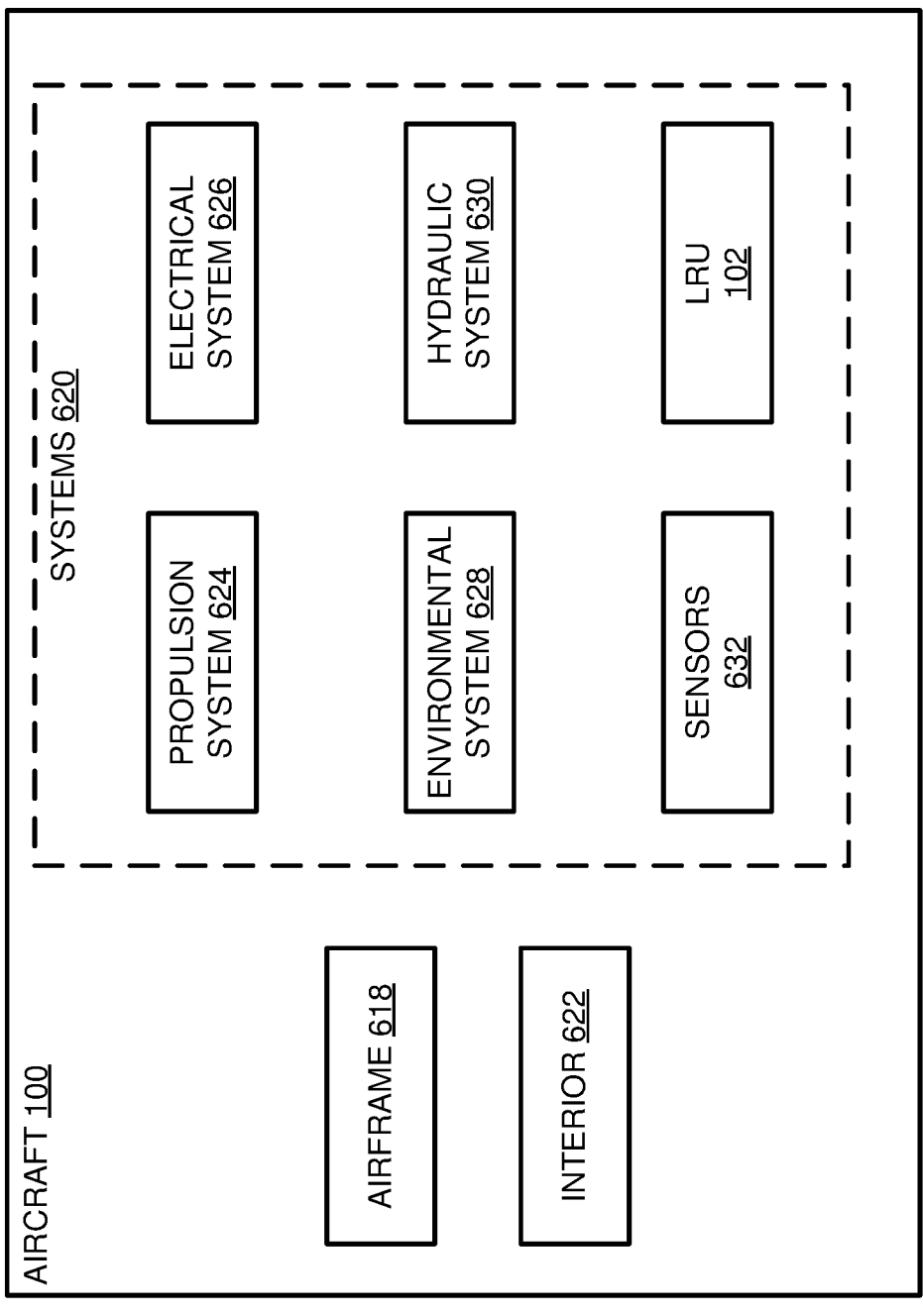
FIG. 6 is a block diagram of a particular implementation of the aircraft of FIG. 1.

FIG. 6 is a block diagram of a particular implementation of the aircraft 100 of FIG. 1. In the example of FIG. 6, the aircraft 100 includes an airframe 618 with a plurality of systems 620 and an interior 622. Examples of the plurality of systems 620 include one or more of a propulsion system 624, an electrical system 626, an environmental system 628, and a hydraulic system 630. Any number of other systems may be included. In particular, in the example of FIG. 6, the systems 620 also include sensors 632 and the LRU 102. In some implementations, the sensors 632 can include a plurality of airstream sensors configured to generate airstream data representing measurements of a diverse set of airstream parameters. For example, the sensors 632 can include or correspond to the airstream sensors 120, or a subset thereof. In some implementations, the sensors 632 also include one or more inertial sensors, one or more configuration sensors (e.g., flap position sensors), etc.

FIG. 7 is a block diagram of a computing environment 700 including the LRU 102. The LRU 102 is configured to support aspects of computer-implemented methods and computer-executable program instructions (or code) according to the present disclosure. For example, the LRU 102, or portions thereof, is configured to execute instructions to initiate, perform, or control one or more operations described with reference to FIGS. 1-6.

The LRU 102 includes the processor(s) 104. In this context, the term "processor" refers to an integrated circuit consisting of logic cells, interconnects, input/output blocks, clock management components, memory, and optionally other special purpose hardware components, designed to execute instructions and perform various computational tasks. Examples of processors 104 include, without limitation, central processing units (CPUs), digital signal processors (DSPS), neural processing units (NPU), graphics processing units (GPUs), field programmable gate arrays (FPGAs), microcontrollers, quantum processors, coprocessors, vector processors, application specific integrated circuits (ASICS), other similar circuits, and variants and combinations thereof. In some cases, a processor can be integrated with other components, such as communication components, input/output components, etc. to form a system on a chip (SOC) device or a packaged electronic device.

Taking CPUs as a starting point, a CPU typically includes one or more processor cores, each of which includes a complex, interconnected network of transistors and other circuit components defining logic gates, memory elements, etc. A core is responsible for executing instructions to, for example, perform arithmetic and logical operations. Typically, a CPU includes an Arithmetic Logic Unit (ALU) that handles mathematical operations and a Control Unit that generates signals to coordinate the operation of other CPU components, such as to manage operations of a fetch-decode-execute cycle.

CPUs and/or individual processor cores generally include local memory circuits, such as registers and cache to temporarily store data during operations. Registers include high-speed, small-sized memory units intimately connected to the logic cells of a CPU. Often registers include transistors arranged as groups of flip-flops, which are configured to store binary data. Caches include fast, on-chip memory circuits used to store frequently accessed data. Caches can be implemented, for example, using Static Random-Access Memory (SRAM) circuits.

Operations of a CPU (e.g., arithmetic operations, logic operations, and flow control operations) are directed by software and firmware. At the lowest level, the CPU includes an instruction set architecture (ISA) that specifies how individual operations are performed using hardware resources (e.g., registers, arithmetic units, etc.). Higher level software and firmware is translated into various combinations of ISA operations to cause the CPU to perform specific higher-level operations. For example, an ISA typically specifies how the hardware components of the CPU move and modify data to perform operations such as addition, multiplication, and subtraction, and high-level software is translated into sets of such operations to accomplish larger tasks, such as adding two columns in a spreadsheet. Generally, a CPU operates on various levels of software, including a kernel, an operating system, applications, and so forth, with each higher level of software generally being more abstracted from the ISA and usually more readily understandable by human users.

GPUs, NPUs, DSPS, microcontrollers, coprocessors, FPGAs, ASICS, and vector processors include components similar to those described above for CPUs. The differences among these various types of processors are generally related to the use of specialized interconnection schemes and ISAs to improve a processor's ability to perform particular types of operations. For example, the logic gates, local memory circuits, and the interconnects therebetween of a GPU are specifically designed to improve parallel processing, sharing of data between processor cores, and vector operations, and the ISA of the GPU may define operations that take advantage of these structures. As another example, ASICs are highly specialized processors that include similar circuitry arranged and interconnected for a particular task, such as encryption or signal processing. As yet another example, FPGAs are programmable devices that include an array of configurable logic blocks (e.g., interconnect sets of transistors and memory elements) that can be configured (often on the fly) to perform customizable logic functions.

A processor 104 can be configured to perform a specific task by including, within the processor 104, specialized hardware to perform the task. Additionally, or alternatively, the processor 104 can be configured to perform a specific task by loading and/or executing instructions (e.g., computer code) that, when executed, cause the processor to perform the specific task. Loading executable instructions to perform the task causes an internal configuration change in the processor 104 that transforms what may otherwise be a general-purpose processor into a special purpose processor for performing the task.

The processor(s) 104 are configured to communicate with system memory 730, one or more storage devices 740, one or more input/output interfaces 750, one or more communications interfaces 760, or any combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic input/output system for booting the LRU 102 as well as a full operating system to enable the LRU 102 to interact with users, other programs, and other devices. The system memory 730 stores system (program) data 736, such as the airstream sensor data 250 of FIG. 2, the inertial data 260, the configuration data 262, other data, or a combination thereof.

The system memory 730 includes one or more applications 734 (e.g., sets of instructions) executable by the processor(s) 104. As an example, the one or more applications 734 include instructions executable by the processor(s) 104 to initiate, control, or perform one or more operations described with reference to FIGS. 1-6. To illustrate, the one or more applications 734 include instructions executable by the processor(s) 104 to initiate, control, or perform one or more operations described with reference to the ML regression models 106, the ensembler 108, the ML classification model(s) 110, the comparator 212, or a combination thereof.

In a particular implementation, the system memory 730 includes a non-transitory, computer-readable medium storing the instructions that, when executed by the processor(s) 104, cause the processor(s) 104 to initiate, perform, or control operations to estimate values of one or more flight data parameters using machine-learning. The operations can include, for example, obtaining airstream data representing measurements of a diverse set of airstream parameters from a plurality of airstream sensors of an aircraft and providing input data to multiple ML regression models to generate two or more output data values. The input data provided to each ML regression model is based on the airstream data and represents two or more different airstream parameters, and each output data value represents an estimated value of a flight data parameter. The operations can further include providing output data values from two or more of the ML regression models as input to an ensembler to generate a unified output value indicating a unified estimate of the flight data parameter and obtaining a computed value of the flight data parameter. The computed value is determined procedurally based on at least a subset of the airstream data. The operations can further include generating an output based on a comparison of the computed value and the unified output value.

The one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications (e.g., one or more of the applications 734), and program data (e.g., the program data 736). In a particular aspect, the system memory 730, the storage devices 740, or both, include tangible (e.g., non-transitory) computer-readable media. In a particular aspect, one or more of the storage devices 740 are external to the LRU 102.

The one or more input/output interfaces 750 enable the LRU 102 to communicate with one or more input/output devices 770 to facilitate interaction with users (e.g., interaction with flight crew or maintenance personnel), other aircraft systems, or both. For example, the one or more input/output interfaces 750 can include a display interface, an input interface, or both. For example, the input/output interface 750 is adapted to receive input from a user, to receive input from one or more of the sensors 632, or a combination thereof. In some implementations, the input/output interface 750 conforms to one or more standard interface protocols, including serial interfaces (e.g., universal serial bus (USB) interfaces, an ARINC® standard, an interface compliant with an Institute of Electrical and Electronics Engineers (IEEE®) interface standard), parallel interfaces, display adapters, audio adapters, or custom interfaces ("ARINC" is a registered trademark of Arinc Incorporated of Annapolis, Maryland, and "IEEE" is a registered trademark of The Institute of Electrical and Electronics Engineers, Inc. of Piscataway, New Jersey). In some implementations, the input/output device(s) 770 includes one or more user interface devices and displays, including some combination of buttons, keyboards, pointing devices, displays, speakers, microphones, touch screens, and other devices.

The processor(s) 104 are configured to communicate with devices or controllers 780 via the one or more communications interfaces 760. For example, the one or more communications interfaces 760 can include a network interface. The devices or controllers 780 can include, for example, the primary flight computer 112, the flight deck display(s) 114, one or more other devices, or any combination thereof.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-7. In some implementations, part or all of one or more of the operations or methods of FIGS. 1-7 may be implemented by one or more processors (e.g., one or more central processing units (CPUs), one or more graphics processing units (GPUs), one or more digital signal processors (DSPS)) executing instructions, by dedicated hardware circuitry, or any combination thereof.

Particular aspects of the disclosure are described below in sets of interrelated Examples:

According to Example 1, an aircraft includes a plurality of airstream sensors configured to generate airstream data representing measurements of a diverse set of airstream parameters; and one or more processors configured to provide input data to multiple ML regression models to generate two or more output data values, wherein the input data provided to each ML regression model is based on the airstream data and represents two or more different airstream parameters, and wherein each output data value represents an estimated value of a flight data parameter; provide output data values from two or more of the ML regression models as input to an ensembler to generate a unified output value indicating a unified estimate of the flight data parameter; obtain a computed value of the flight data parameter, wherein the computed value is determined procedurally based on at least a subset of the airstream data; and generate an output based on a comparison of the computed value and the unified output value.

Example 2 includes the aircraft of Example 1, wherein the one or more processors are further configured to obtain configuration data indicating a configuration setting of the aircraft, and wherein the input data of at least one of the ML regression models is further based on the configuration data.

Example 3 includes the aircraft of Example 2, wherein the configuration data indicates a flap setting.

Example 4 includes the aircraft of any of Example 2 or Example 3, wherein the configuration data indicates a gear position.

Example 5 includes the aircraft of any of Examples 1 to 4, wherein the one or more processors are further configured to obtain inertial sensor data, and wherein the input data of at least one of the ML regression models is further based on the inertial sensor data.

Example 6 includes the aircraft of any of Examples 1 to 5, wherein the one or more processors are further configured to provide input data to one or more ML classification models to generate a classification output indicating whether one or more values of the airstream data is considered to be valid.

Example 7 includes the aircraft of Example 6, wherein the one or more processors are configured to generate an alert based on a determination that one or more values of the airstream data are invalid.

Example 8 includes the aircraft of any of Examples 1 to 7, wherein the ML regression models include one or more feed-forward neural networks, one or more recurrent neural networks, or both.

Example 9 includes the aircraft of any of Examples 1 to 8, wherein the ML regression models include a first ML regression model configured to generate a first estimated value of the flight data parameter based on a first subset of the airstream parameters; and a second ML regression model configured to generate a second estimated value of the flight data parameter based on a second subset of the airstream parameters, wherein the first subset of the airstream parameters includes one or more airstream parameters absent from the second subset of the airstream parameters.

Example 10 includes the aircraft of any of Examples 1 to 8, wherein the ML regression models include a first ML regression model having a first model architecture; and a second ML regression model having a second model architecture different than the first model architecture.

Example 11 includes the aircraft of any of Examples 1 to 10, wherein the airstream parameters include two or more of: static pressure, total pressure, local angle of attack, impact pressure, and total air temperature.

Example 12 includes the aircraft of any of Examples 1 to 11, wherein the plurality of airstream sensors includes one or more angle of attack sensors, one or more total pressure sensors, one or more temperature sensors, and two or more static pressure sensors.

Example 13 includes the aircraft of any of Examples 1 to 12, wherein the flight data parameter corresponds to aircraft angle of attack, Mach number, aircraft sideslip angle, or altitude.

Example 14 includes the aircraft of any of Examples 1 to 13, wherein one or more of the ML regression models is trained using training data representing an entire flight envelope of the aircraft.

Example 15 includes the aircraft of any of Examples 1 to 14 and further includes a flight deck display, wherein the output is used to generate an indicator for the flight deck display.

Example 16 includes the aircraft of any of Examples 1 to 15, wherein the computed value is generated by a primary flight computer of the aircraft.

Example 17 includes the aircraft of any of Examples 1 to 16, wherein the one or more processors are further configured to provide additional input data to multiple additional ML regression models to generate two or more additional output data values, wherein the additional input data provided to each additional ML regression model is based on the airstream data and represents two or more different airstream parameters, and wherein each additional output data value represents an estimated value of an additional flight data parameter; provide additional output data values from two or more of the additional ML regression models as input to an additional ensembler to generate an additional unified output value indicating a unified estimate of the additional flight data parameter; and obtain a computed value of the additional flight data parameter, wherein the computed value of the additional flight data parameter is determined procedurally based on at least a subset of the airstream data, wherein the output is further based on a comparison of the additional computed value and the additional unified output value.

According to Example 18, a method includes obtaining airstream data representing measurements of a diverse set of airstream parameters from a plurality of airstream sensors of an aircraft; providing input data to multiple ML regression models to generate two or more output data values, wherein the input data provided to each ML regression model is based on the airstream data and represents two or more different airstream parameters, and wherein each output data value represents an estimated value of a flight data parameter; providing output data values from two or more of the ML regression models as input to an ensembler to generate a unified output value indicating a unified estimate of the flight data parameter; obtaining a computed value of the flight data parameter, wherein the computed value is determined procedurally based on at least a subset of the airstream data; and generating an output based on a comparison of the computed value and the unified output value.

Example 19 includes the method of Example 18, further comprising obtaining configuration data indicating a configuration setting of the aircraft, and wherein the input data of at least one of the ML regression models is further based on the configuration data.

Example 20 includes the method of Example 19, wherein the configuration data indicates a flap setting.

Example 21 includes the method of Example 19 or Example 20, wherein the configuration data indicates a gear position.

Example 22 includes the method of any of Examples 18 to 21 and further includes obtaining inertial sensor data, and wherein the input data of at least one of the ML regression models is further based on the inertial sensor data.

Example 23 includes the method of any of Examples 18 to 22 and further includes providing input data to one or more ML classification models to generate a classification output indicating whether one or more values of the airstream data is considered to be valid.

Example 24 includes the method of Example 23 and further includes generating an alert based on a determination that one or more values of the airstream data are invalid.

Example 25 includes the method of any of Examples 18 to 24, wherein the ML regression models include one or more feed-forward neural networks, one or more recurrent neural networks, or both.

Example 26 includes the method of any of Examples 18 to 25, wherein the ML regression models include a first ML regression model configured to generate a first estimated value of the flight data parameter based on a first subset of the airstream parameters; and a second ML regression model configured to generate a second estimated value of the flight data parameter based on a second subset of the airstream parameters, wherein the first subset of the airstream parameters includes one or more airstream parameters absent from the second subset of the airstream parameters.

Example 27 includes the method of any of Examples 18 to 26, wherein the ML regression models include a first ML regression model having a first model architecture; and a second ML regression model having a second model architecture different than the first model architecture.

Example 28 includes the method of any of Examples 18 to 27, wherein the airstream parameters include two or more of: static pressure, total pressure, impact pressure, local angle of attack, and total air temperature.

Example 29 includes the method of any of Examples 18 to 28, wherein the plurality of airstream sensors includes one or more angle of attack sensors, one or more total pressure sensors, one or more temperature sensors, and two or more static pressure sensors.

Example 30 includes the method of any of Examples 18 to 29, wherein the flight data parameter corresponds to aircraft angle of attack, Mach number, aircraft sideslip angle, or altitude.

Example 31 includes the method of any of Examples 18 to 30, wherein one or more of the ML regression models is trained using training data representing an entire flight envelope of the aircraft.

Example 32 includes the method of any of Examples 18 to 31 and further includes generating an indicator for a flight deck display based on the output.

Example 33 includes the method of any of Examples 18 to 32, wherein the computed value is generated by a primary flight computer of the aircraft.

Example 34 includes the method of any of Examples 18 to 33 and further includes providing additional input data to multiple additional ML regression models to generate two or more additional output data values, wherein the additional input data provided to each additional ML regression model is based on the airstream data and represents two or more different airstream parameters, and wherein each additional output data value represents an estimated value of an additional flight data parameter; providing additional output data values from two or more of the additional ML regression models as input to an additional ensembler to generate an additional unified output value indicating a unified estimate of the additional flight data parameter; and obtaining a computed value of the additional flight data parameter, wherein the computed value of the additional flight data parameter is determined procedurally based on at least a subset of the airstream data, wherein the output is further based on a comparison of the additional computed value and the additional unified output value.

According to Example 35, a line-replaceable unit includes one or more processors configured to obtain airstream data representing measurements of a diverse set of airstream parameters from a plurality of airstream sensors of an aircraft; provide input data to multiple ML regression models to generate two or more output data values, wherein the input data provided to each ML regression model is based on the airstream data and represents two or more different airstream parameters, and wherein each output data value represents an estimated value of a flight data parameter; provide output data values from two or more of the ML regression models as input to an ensembler to generate a unified output value indicating a unified estimate of the flight data parameter; obtain a computed value of the flight data parameter, wherein the computed value is determined procedurally based on at least a subset of the airstream data; and generate an output based on a comparison of the computed value and the unified output value.

Example 36 includes the line-replaceable unit of Example 35, wherein the one or more processors are further configured to obtain configuration data indicating a configuration setting of the aircraft, and wherein the input data of at least one of the ML regression models is further based on the configuration data.

Example 37 includes the line-replaceable unit of Example 36, wherein the configuration data indicates a flap setting.

Example 38 includes the line-replaceable unit of Example 36 or Example 37, wherein the configuration data indicates a gear position.

Example 39 includes the line-replaceable unit of any of Examples 35 to 38, wherein the one or more processors are further configured to obtain inertial sensor data, and wherein the input data of at least one of the ML regression models is further based on the inertial sensor data.

Example 40 includes the line-replaceable unit of any of Examples 35 to 39, wherein the one or more processors are further configured to provide input data to one or more ML classification models to generate a classification output indicating whether one or more values of the airstream data is considered to be valid.

Example 41 includes the line-replaceable unit of Example 40, wherein the one or more processors are configured to generate an alert based on a determination that one or more values of the airstream data are invalid.

Example 42 includes the line-replaceable unit of any of Examples 35 to 41, wherein the ML regression models include one or more feed-forward neural networks, one or more recurrent neural networks, or both.

Example 43 includes the line-replaceable unit of any of Examples 35 to 42, wherein the ML regression models include a first ML regression model configured to generate a first estimated value of the flight data parameter based on a first subset of the airstream parameters; and a second ML regression model configured to generate a second estimated value of the flight data parameter based on a second subset of the airstream parameters, wherein the first subset of the airstream parameters includes one or more airstream parameters absent from the second subset of the airstream parameters.

Example 44 includes the line-replaceable unit of any of Examples 35 to 42, wherein the ML regression models include a first ML regression model having a first model architecture; and a second ML regression model having a second model architecture different than the first model architecture.

Example 45 includes the line-replaceable unit of any of Examples 35 to 44, wherein the airstream parameters include two or more of: static pressure, total pressure, impact pressure, local angle of attack, and total air temperature.

Example 46 includes the line-replaceable unit of any of Examples 35 to 45, wherein the plurality of airstream sensors includes one or more angle of attack sensors, one or more total pressure sensors, one or more temperature sensors, and two or more static pressure sensors.

Example 47 includes the line-replaceable unit of any of Examples 35 to 46, wherein the flight data parameter corresponds to aircraft angle of attack, Mach number, aircraft sideslip angle, or altitude.

Example 48 includes the line-replaceable unit of any of Examples 35 to 47, wherein one or more of the ML regression models is trained using training data representing an entire flight envelope of the aircraft.

Example 49 includes the line-replaceable unit of any of Examples 35 to 48, wherein the one or more processors are further configured to generate an indicator for a flight deck display of the aircraft based on the output.

Example 50 includes the line-replaceable unit of any of Examples 35 to 49, wherein the computed value is generated by a primary flight computer of the aircraft.

Example 51 includes the line-replaceable unit of any of Examples 35 to 50, wherein the one or more processors are further configured to provide additional input data to multiple additional ML regression models to generate two or more additional output data values, wherein the additional input data provided to each additional ML regression model is based on the airstream data and represents two or more different airstream parameters, and wherein each additional output data value represents an estimated value of an additional flight data parameter; provide additional output data values from two or more of the additional ML regression models as input to an additional ensembler to generate an additional unified output value indicating a unified estimate of the additional flight data parameter; and obtain a computed value of the additional flight data parameter, wherein the computed value of the additional flight data parameter is determined procedurally based on at least a subset of the airstream data, wherein the output is further based on a comparison of the additional computed value and the additional unified output value.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
a plurality of airstream sensors configured to generate airstream data representing measurements of a diverse set of airstream parameters; and
one or more processors configured to:
provide input data to multiple machine-learning (ML) regression models to generate two or more output data values, wherein the input data provided to each ML regression model is based on the airstream data and represents two or more different airstream parameters, and wherein each output data value represents an estimated value of a flight data parameter;
provide output data values from two or more of the ML regression models as input to an ensembler to generate a unified output value indicating a unified estimate of the flight data parameter;
obtain a computed value of the flight data parameter, wherein the computed value is determined procedurally at a primary flight computer based on at least a subset of the airstream data; and
generate an output based on a comparison of the computed value and the unified output value.

2. The aircraft of claim 1, wherein the one or more processors are further configured to obtain configuration data indicating a configuration setting of the aircraft, and wherein the input data of at least one of the ML regression models is further based on the configuration data.

3. The aircraft of claim 2, wherein the configuration data indicates a flap setting, a landing gear position, or both.

4. The aircraft of claim 1, wherein the one or more processors are further configured to obtain inertial sensor data, and wherein the input data of at least one of the ML regression models is further based on the inertial sensor data.

5. The aircraft of claim 1, wherein the one or more processors are further configured to provide input data to one or more ML classification models to generate a classification output indicating whether one or more values of the airstream data is considered to be valid.

6. The aircraft of claim 1, wherein the ML regression models include:
a first ML regression model configured to generate a first estimated value of the flight data parameter based on a first subset of the airstream parameters; and
a second ML regression model configured to generate a second estimated value of the flight data parameter based on a second subset of the airstream parameters, wherein the first subset of the airstream parameters includes one or more airstream parameters absent from the second subset of the airstream parameters.

7. The aircraft of claim 1, wherein the ML regression models include:
a first ML regression model having a first model architecture; and
a second ML regression model having a second model architecture different than the first model architecture.

8. The aircraft of claim 1, wherein the plurality of airstream sensors include one or more angle of attack sensors, one or more total pressure sensors, one or more temperature sensors, and one or more static pressure sensors, and wherein the flight data parameter corresponds to aircraft angle of attack, Mach number, aircraft sideslip angle, or altitude.

9. The aircraft of claim 1, wherein one or more of the ML regression models is trained using training data representing an entire flight envelope of the aircraft.

10. The aircraft of claim 1, further comprising a flight deck display, wherein the output is used to generate an indicator for the flight deck display.

11. The aircraft of claim 1, wherein the computed value is provided to a flight deck display.

12. A method comprising:
obtaining airstream data representing measurements of a diverse set of airstream parameters from a plurality of airstream sensors of an aircraft;
providing input data to multiple machine-learning (ML) regression models to generate two or more output data values, wherein the input data provided to each ML regression model is based on the airstream data and represents two or more different airstream parameters, and wherein each output data value represents an estimated value of a flight data parameter;
providing output data values from two or more of the ML regression models as input to an ensembler to generate a unified output value indicating a unified estimate of the flight data parameter;
obtaining a computed value of the flight data parameter, wherein the computed value is determined procedurally at a primary flight computer based on at least a subset of the airstream data; and
generating an output based on a comparison of the computed value and the unified output value.

13. The method of claim 12, further comprising obtaining configuration data indicating a configuration setting of the aircraft, and wherein the input data of at least one of the ML regression models is further based on the configuration data.

14. The method of claim 13, wherein the configuration data indicates a flap setting, a landing gear position, or both.

15. The method of claim 12, further comprising obtaining inertial sensor data, and wherein the input data of at least one of the ML regression models is further based on the inertial sensor data.

16. The method of claim 12, further comprising providing input data to one or more ML classification models to generate a classification output indicating whether one or more values of the airstream data is considered to be valid.

17. The method of claim 12, wherein the ML regression models include:
a first ML regression model configured to generate a first estimated value of the flight data parameter based on a first subset of the airstream parameters; and
a second ML regression model configured to generate a second estimated value of the flight data parameter based on a second subset of the airstream parameters, wherein the first subset of the airstream parameters includes one or more airstream parameters absent from the second subset of the airstream parameters.

18. The method of claim 12, wherein the ML regression models include:
   a first ML regression model having a first model architecture; and
   a second ML regression model having a second model architecture different than the first model architecture.

19. The method of claim 12, further comprising:
   providing additional input data to multiple additional ML regression models to generate two or more additional output data values, wherein the additional input data provided to each additional ML regression model is based on the airstream data and represents two or more different airstream parameters, and wherein each additional output data value represents an estimated value of an additional flight data parameter;
   providing additional output data values from two or more of the additional ML regression models as input to an additional ensembler to generate an additional unified output value indicating a unified estimate of the additional flight data parameter; and
   obtaining a computed value of the additional flight data parameter, wherein the computed value of the additional flight data parameter is determined procedurally based on at least a subset of the airstream data, wherein the output is further based on a comparison of the computed value of the additional flight data parameter and the additional unified output value.

20. A line-replaceable unit comprising:
   one or more processors configured to:
      obtain airstream data representing measurements of a diverse set of airstream parameters from a plurality of airstream sensors of an aircraft;
      provide input data to multiple machine-learning (ML) regression models to generate two or more output data values, wherein the input data provided to each ML regression model is based on the airstream data and represents two or more different airstream parameters, and wherein each output data value represents an estimated value of a flight data parameter;
      provide output data values from two or more of the ML regression models as input to an ensembler to generate a unified output value indicating a unified estimate of the flight data parameter;
      obtain a computed value of the flight data parameter, wherein the computed value is determined procedurally at a primary flight computer based on at least a subset of the airstream data; and
      generate an output based on a comparison of the computed value and the unified output value.

* * * * *